(12) United States Patent
Matsunaga et al.

(10) Patent No.: US 11,924,265 B2
(45) Date of Patent: Mar. 5, 2024

(54) COMMUNICATION DEVICE, USER TERMINAL, COMMUNICATION SYSTEM, CONTROLLING METHOD OF SAME, AND PROGRAM

(71) Applicant: Honda Motor Co., Ltd., Tokyo (JP)

(72) Inventors: Hideki Matsunaga, Wako (JP); Masaru Otaka, Wako (JP); Masamitsu Tsuchiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 418 days.

(21) Appl. No.: 17/173,368

(22) Filed: Feb. 11, 2021

(65) Prior Publication Data

US 2021/0168190 A1 Jun. 3, 2021

Related U.S. Application Data

(63) Continuation of application No. PCT/JP2019/014305, filed on Mar. 29, 2019.

(51) Int. Cl.
*H04L 12/26* (2006.01)
*G05D 1/00* (2006.01)
*H04L 65/80* (2022.01)
*H04W 4/021* (2018.01)
*H04W 4/44* (2018.01)

(52) U.S. Cl.
CPC .......... *H04L 65/80* (2013.01); *G05D 1/0022* (2013.01); *H04W 4/021* (2013.01); *H04W 4/44* (2018.02); *G05D 2201/0213* (2013.01)

(58) Field of Classification Search
CPC ....... H04L 65/80; H04L 65/611; H04L 47/10; H04L 47/30; H04L 47/11; H04L 47/12; G05D 1/0022; G05D 2201/0213; H04W 4/021; H04W 4/44; H04W 4/40; H04W 24/10; H04W 64/00; G08G 1/09; H04Q 11/0478

See application file for complete search history.

(56) References Cited

U.S. PATENT DOCUMENTS

2002/0191594 A1* 12/2002 Itoh ................ H04W 28/22
370/352
2004/0185869 A1* 9/2004 Lee ................. H04W 8/08
455/12.1

(Continued)

FOREIGN PATENT DOCUMENTS

CN 101971540 A 2/2011
CN 107852649 A 3/2018
(Continued)

OTHER PUBLICATIONS

International Search Report of related international application PCT/JP2019/014305, dated May 28, 2019.

(Continued)

*Primary Examiner* — Phuongchau Ba Nguyen
(74) *Attorney, Agent, or Firm* — Suzanne Gagnon; American Honda Motor Co., Inc.

(57) ABSTRACT

A communication system includes a communication device that may transmit a command for requesting a response about communication quality to a specific type of user terminal, and a user terminal that may transmit the communication quality in response to the command.

17 Claims, 5 Drawing Sheets

(56) References Cited

U.S. PATENT DOCUMENTS

| | | | |
|---|---|---|---|
| 2008/0186913 A1* | 8/2008 | Ahn | H04L 47/2433 370/329 |
| 2008/0228654 A1* | 9/2008 | Edge | H04W 4/029 455/456.2 |
| 2010/0210240 A1* | 8/2010 | Mahaffey | H04W 12/126 455/411 |
| 2012/0295623 A1* | 11/2012 | Siomina | G01S 5/0263 455/456.2 |
| 2013/0324154 A1* | 12/2013 | Raghupathy | H04W 4/025 455/456.1 |
| 2014/0022987 A1* | 1/2014 | Kao | H04L 65/611 370/328 |
| 2014/0225923 A1* | 8/2014 | Huang | H04W 8/20 345/633 |
| 2014/0268601 A1* | 9/2014 | Valentino | G01T 1/026 361/752 |
| 2014/0368601 A1 | 12/2014 | Decharms | |
| 2016/0018821 A1 | 1/2016 | Akita et al. | |
| 2017/0220041 A1* | 8/2017 | Tanaka | H04B 1/3822 |
| 2018/0253092 A1* | 9/2018 | Trapero Esteban | B64C 39/024 |
| 2018/0376485 A1 | 12/2018 | Kahtava et al. | |

FOREIGN PATENT DOCUMENTS

| | | |
|---|---|---|
| EP | 3300551 B | 4/2020 |
| JP | 2005094344 A | 4/2005 |
| JP | 2008306240 A | 12/2008 |
| JP | 2016024613 A | 2/2016 |
| JP | 2017216663 A | 12/2017 |
| JP | 2018530174 A | 10/2018 |
| KR | 100776136 B1 | 11/2007 |
| KR | 20140037636 A | 3/2014 |
| WO | WO2017001223 A1 | 1/2017 |

OTHER PUBLICATIONS

English Translation of International Search Report of related international application PCT/JP2019/014305, dated May 28, 2019.
Written Opinion of the International Searching Authority of related international application PCT/JP2019/014305, dated May 28, 2019.
Notice of Reasons for Refusal from Japan Patent Office for Japanese Patent Application No. 2021-511750, dated Nov. 4, 2022.
Notification of first review comments from Chinese Intellectual Property Office for Chinese Patent Application No. 2019800946654, dated Jun. 1, 2023.

* cited by examiner

COMMUNICATION DEVICE, USER TERMINAL, COMMUNICATION SYSTEM, CONTROLLING METHOD OF SAME, AND PROGRAM

CROSS-REFERENCE TO RELATED APPLICATION

This application is a continuation of International Patent Application No. PCT/JP2019/014305 filed Mar. 29, 2019, the entire disclosure of which is incorporated herein by reference.

BACKGROUND

An operator at a remote location may operate and move a vehicle through remote driving techniques. One element with remote driving may be to sufficiently suppress communication delay between an operator device operated by an operator performing remote driving and a user terminal provided in a vehicle.

SUMMARY

When communication quality is low, remote driving may not be possible. Therefore, communication quality in a traveling direction of a vehicle is acquired in advance, and remote driving is ended before the communication quality deteriorates. The communication quality may vary based on a type of user terminal.

According to an aspect of the disclosure, a communication system is provided. The communication system includes: a communication device having a memory storing instruction when executed by a processor causes the processor to transmit a command for requesting a response about communication quality to a specific type of user terminal; and a user terminal having a memory storing instruction when executed by a processor causes the processor to transmit the communication quality in response to the command.

According to another aspect of the disclosure, a computer-implemented method of controlling a communication system is provided. The method includes: transmitting by a communication device a command for requesting a response on communication quality to a specific type of user terminal; and receiving by the communication device the communication quality from a user terminal in response to the command.

According to another aspect of the disclosure, a user terminal is provided. The user terminal includes a memory storing instruction when executed by a processor causes the processor: to receive information identifying a specific type of user terminal from a communication device; determine whether or not the user terminal is the specific type based on the information; and transmit the communication quality if the user terminal is the specific type.

With the aforementioned, communication quality based on a type of user terminal can be acquired. Other features and advantages of the present disclosure will be apparent based on the following description with reference to the attached drawings. Note that in the attached drawings, the same or similar configurations are denoted by the same reference numerals.

BRIEF DESCRIPTION OF THE DRAWINGS

The attached drawings are included in and make up a portion of the specification, illustrate embodiments of the present disclosure, and are used along with descriptions thereof to describe aspects of the present disclosure.

DESCRIPTION OF EMBODIMENTS

Embodiments are described in detail below with reference to the attached drawings. Note that the following embodiments do not limit the disclosure according to the claims, and not all combinations of the features described in the embodiments are essential to the disclosure. Two or more of a plurality of features described in the embodiments may be arbitrarily combined.

Figure 1:
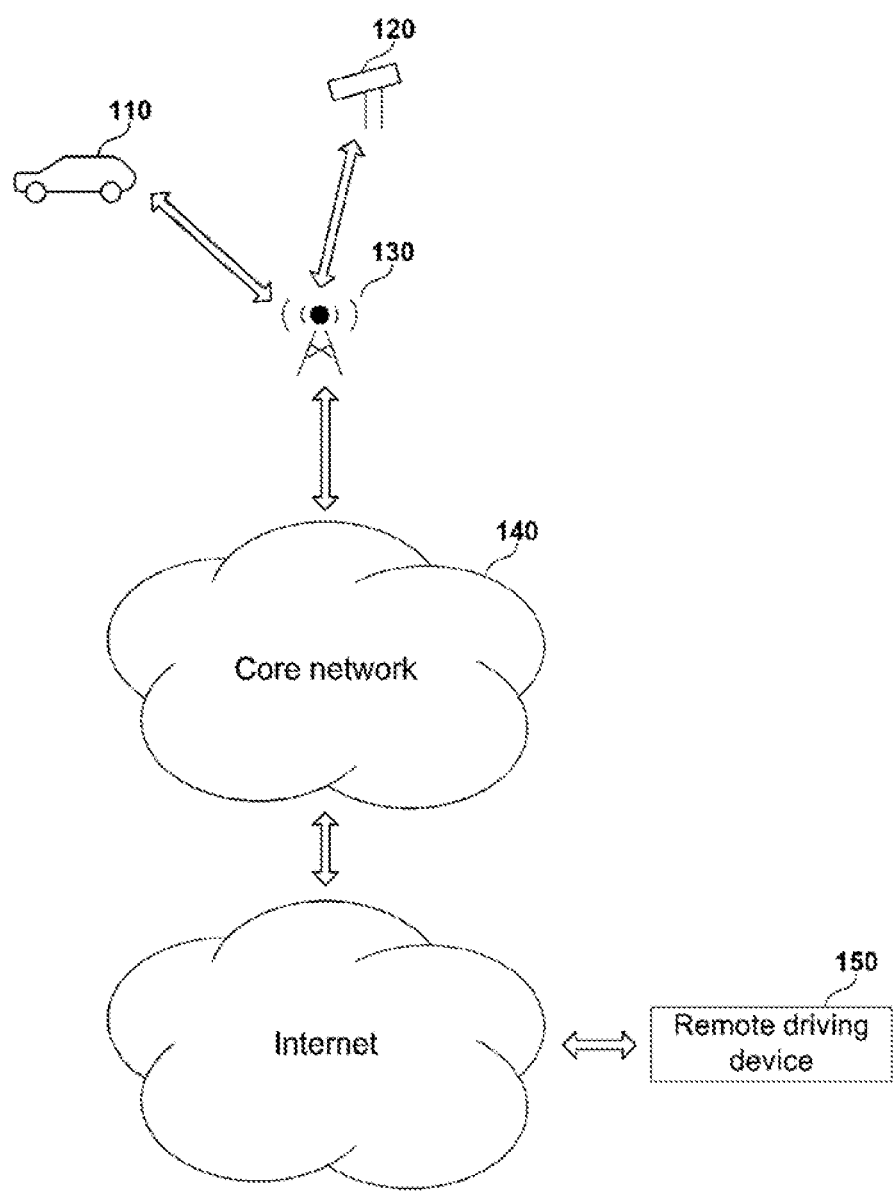
FIG. 1 is a block diagram illustrating a configuration example of a communication system according to an exemplary embodiment.

FIG. 1 illustrates a configuration example of a communication system according to an exemplary embodiment. The communication system may comply with any communication standard such as 3G, 4G, 5G, and the like. The communication system includes a plurality of user terminals (UE: user equipment), a wireless base station 130, a core network 140, and a remote driving device 150. The user terminal is a communication device that receives a communication service from the core network 140, and may also be referred to as a terminal device or simply a terminal. The user terminal may be one of various types of communication devices such as vehicles, mobile phones, and road management cameras. In the exemplary embodiment, a vehicle 110 (specifically, a communication device incorporated in the vehicle or brought into the vehicle) and a management camera 120 are shown as user terminals. The vehicle 110 is an example of a moving body, in other words, a user terminal that performs communication in a condition where a geographical position is not fixed and may be referred to as a mobile user terminal. The management camera 120 is a camera installed along a road to acquire a traffic condition, and may be also referred to as a road management camera or control camera. The management camera 120 is an example of a user terminal that performs communication in a condition where a geographical position is fixed and may be referred to as a fixed user terminal.

The wireless base station 130 is a communication device for providing a wireless connection with the user terminal. The wireless base station 130 may be referred to as an eNodeB in a 4G network, and a gNodeB in a 5G network. The wireless base station 130 is connected to the core network 140. The vehicle 110 and management camera 120 may communicate with the Internet via the wireless base station 130 and core network 140.

The remote driving device 150 is a device for providing a remote driving service to a vehicle having a remote driving function. A remote driving device 150 is positioned remotely from a vehicle to be provided with the remote driving service. For example, the remote driving device 150 provides a remote driving service to the vehicle 110.

Figure 2:
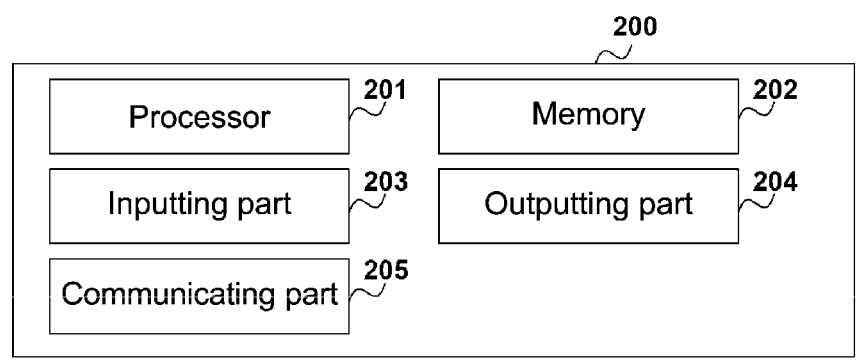
FIG. 2 is a block diagram illustrating a configuration example of a user terminal according to an exemplary embodiment.

A configuration example of a user terminal 200 according to an exemplary embodiment is described while referring to FIG. 2. The user terminal 200 includes a processor 201, memory 202, inputting part 203, outputting part 204, and communicating part 205. The user terminal 200 may include one or more other elements based on the type of communication device. If the user terminal 200 is the vehicle 110, the user terminal 200 may further include one or more sensors for acquiring a condition of the vehicle 110, condition of a driver, or peripheral information of the vehicle 110, or a travel controlling part (for example, an electronic control unit (ECU) for automatic driving) that automatically controls at least one of steering or acceleration/deceleration of the vehicle 110. When the user terminal 200 is the management camera 120, the user terminal 200 may further include an image sensor or the like for imaging a road condition.

The processor 201 controls operation of the user terminal 200. The processor 201 functions, for example, as a central processing unit (CPU). The memory 202 stores a program used for operation of the user terminal 200, temporary data, and the like. The memory 202 is implemented, for example, by a read only memory (ROM), a random access memory (RAM), or the like. Furthermore, the memory 202 may include a secondary storage such as a hard disk drive. The inputting part 203 is used by a user of the user terminal 200 to input to the user terminal 200. The outputting part 204 is used to output information from the user terminal 200 to the user, and is implemented, for example, by a displaying device (e.g., display) or acoustic device (e.g., speaker). The communicating part 205 provides a function where the user terminal 200 communicates with another device such as the wireless base station 130, another user terminal, or the like, and is implemented, for example, by an antenna, baseband processor, or the like.

The remote driving device 150 may have the same configuration as the user terminal 200. Furthermore, the remote driving device 150 may include an operating device (for example, steering wheel, access pedal, brake pedal, or the like) for an operator of the remote driving device 150 to control a behavior of the vehicle 110.

Figure 3:
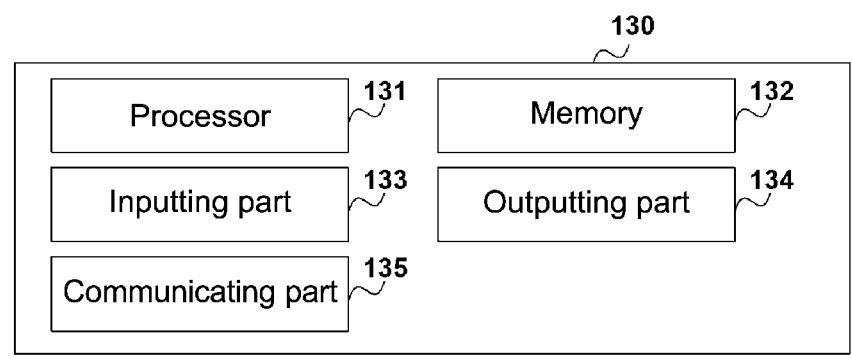
FIG. 3 is a block diagram illustrating a configuration example of a wireless base station according to an exemplary embodiment.

A configuration example of the wireless base station 130 according to an exemplary embodiment is described while referring to FIG. 3. The wireless base station 130 includes a processor 131, a memory 132, an inputting part 133, an outputting part 134, and a communicating part 135.

The processor 131 controls operation of the wireless base station 130. The processor 131 functions, for example, as a CPU. The memory 132 stores a program used for operation of the wireless base station 130, temporary data, and the like. The memory 132 is implemented, for example, by a ROM, a RAM, or the like. Furthermore, the memory 132 may include a secondary storage such as a hard disk drive. The inputting part 133 is used by the user of the wireless base station 130 to input to the wireless base station 130. The outputting part 134 is used to output information from the wireless base station 130 to the user, and is implemented, for example, by a displaying device (e.g., display) or acoustic device (e.g., speaker). The communicating part 135 provides a function where the wireless base station 130 communicates with another device such as the vehicle 110, management camera 120, entity within the core network 140, or the like, and is implemented, for example, by an antenna, baseband processor, or the like.

Figure 4:
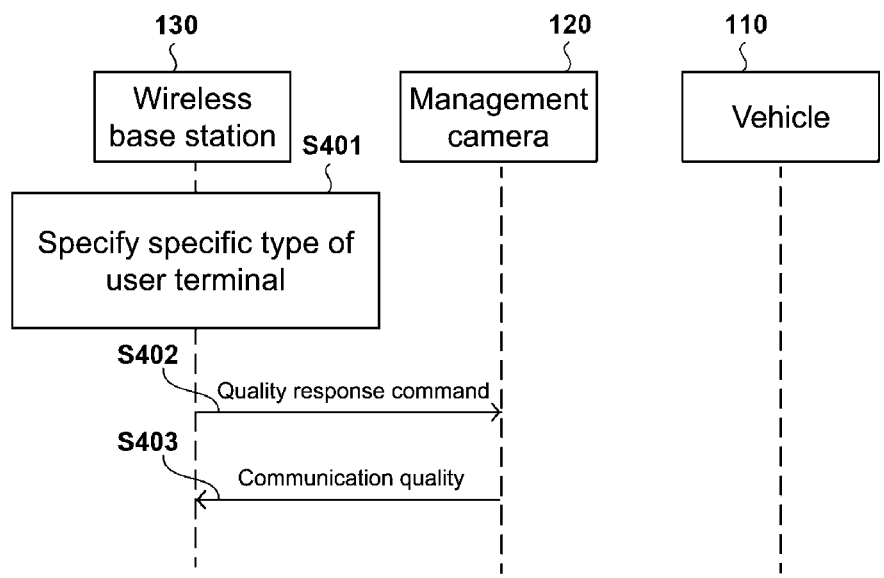
FIG. 4 is a sequence diagram illustrating an operation example of a communication system according to an exemplary embodiment.
Figure 5:
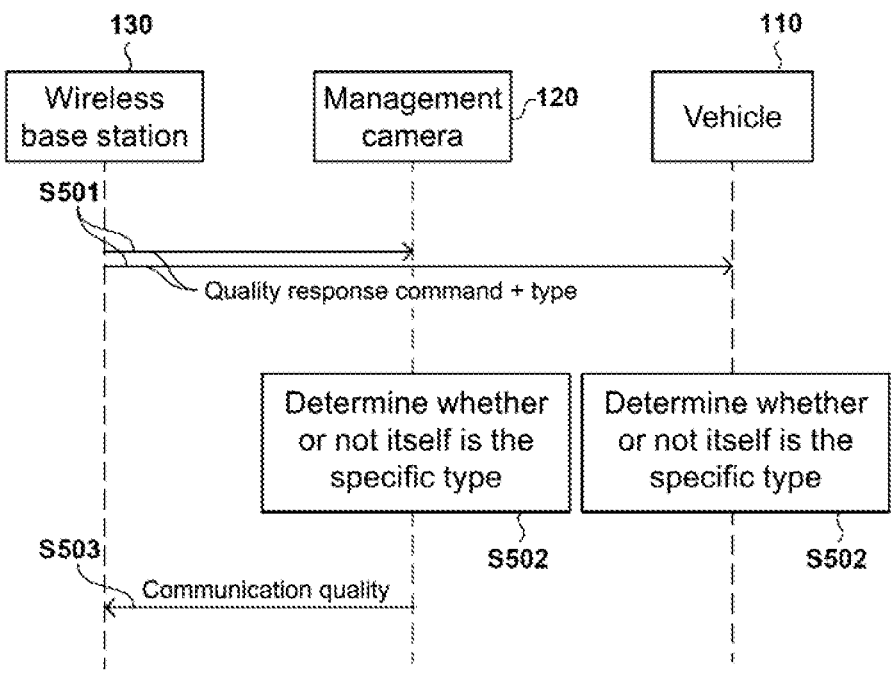
FIG. 5 is a sequence diagram illustrating an operation example of a communication system according to an exemplary embodiment.

A method where the wireless base station 130 acquires the communication quality of a specific type of user terminal 200 in some embodiments is described while referring for FIG. 4 and FIG. 5. Each step of the method described in FIG. 4 and FIG. 5 may be performed, for example, by the processors of the devices (e.g., vehicle 110, management camera 120, wireless base station 130, and the like) executing a program stored in the memory. Alternatively, some or all steps of the method may be implemented in hardware such as an application specific integrated circuit (ASIC). The methods in FIG. 4 and FIG. 5 may be periodically executed by the wireless base station 130 to acquire the communication quality of the user terminal 200, or may be executed in response to a request from another device (e.g., remote driving device 150). The communication quality of the user terminal 200 may be, for example, a measured value corresponding to a communication delay or a communicable data capacity.

In the method in FIG. 4, the wireless base station 130 individually transmits a command requesting a communication quality response (hereinafter, referred to as quality response command) to a specific type of user terminal 200. Specifically, in step S401, the wireless base station 130 specifies a specific type of user terminal. A specific type of user terminal is a user terminal subject to communication quality measurement. For example, one specific type of user terminal may be a terminal at a specific geographical position (for example, user terminal within a radius of 50 m from a specific intersection). Additionally or alternatively, another specific type of user terminal may be a fixed user terminal (e.g., management camera 120). In some aspects, a list of fixed user terminals may be stored in advance in the memory 132 of the wireless base station 130. The processor 131 of the wireless base station 130 may specify the specific type of user terminal by referencing the list in the memory 132. In other aspects, the wireless base station 130 may inquire the user terminals in a cell about a current position, and identify a terminal at a specific geographical position based on the response.

In step S402, the wireless base station 130 transmits a quality response command to the specified specific type of user terminal. For example, the specific type of user terminal may be a fixed user terminal (e.g., management camera 120). In this case, a wireless base station 130 transmits a quality response command to the management camera 120, and does not transmit a quality response command to the vehicle 110.

In step S403, the user terminal 200 (e.g., management camera 120) receiving the quality response command transmits the communication quality to the wireless base station 130 in response to the quality response command. In some aspects, the wireless base station 130 may provide the communication quality acquired thereby in response to a request from another device (e.g., remote driving device 150).

The user terminal 200 may transmit the communication quality to another device in addition to or in place of transmitting the communication quality to the wireless base station 130 in step S403. A transmission destination to another device may be set in advance or designated by the quality response command. The user terminal 200 may newly measure and transmit the communication quality after receiving the quality response command, or may transmit the communication quality measured immediately prior to receiving the quality response command.

In the method in FIG. 5, the wireless base station 130 broadcasts a command requesting a communication quality response along with information identifying a specific type of user terminal 200. Specifically, in step S501, the wireless base station 130 broadcasts a quality response command to user terminals 200 included in a cell along with information identifying the specific type of user terminal 200.

In step S502, each user terminal 200 determines whether or not its own type is the specific type based on the information received along with the quality response command. For example, the information identifying the specific type of user terminal may indicate a fixed user terminal (e.g., management camera 120). In this case, the management camera 120 determines that its own type is the specific type, and the vehicle 110 determines that its own type is not the specific type.

In step S503, the user terminal 200 (specifically, management camera 120) determining that its own type is the specific type transmits the communication quality to the wireless base station 130 in response to the quality response command. The user terminal 200 (specifically, vehicle 110) determining that its own type is not the specific type does not respond to the quality response command.

In either of the methods of FIG. 4 and FIG. 5, the wireless base station 130 transmits the quality response command to the user terminal 200 of a specific type. Therefore, the wireless base station 130 may acquire the communication quality from only the user terminal 200 of the specific type.

In the methods of FIG. 4 and FIG. 5, the wireless base station 130 is the communication device that transmits a quality response command to the specific type of user terminal. Alternatively, a communication device other than the wireless base station 130 may transmit a quality response command to the specific type of user terminal. For example, another communication device that may transmit a quality response command may be a device within the core network 140 such as a mobility management entity (MME) or a server device providing a predetermined service (e.g., remote driving device 150).

Figure 6:
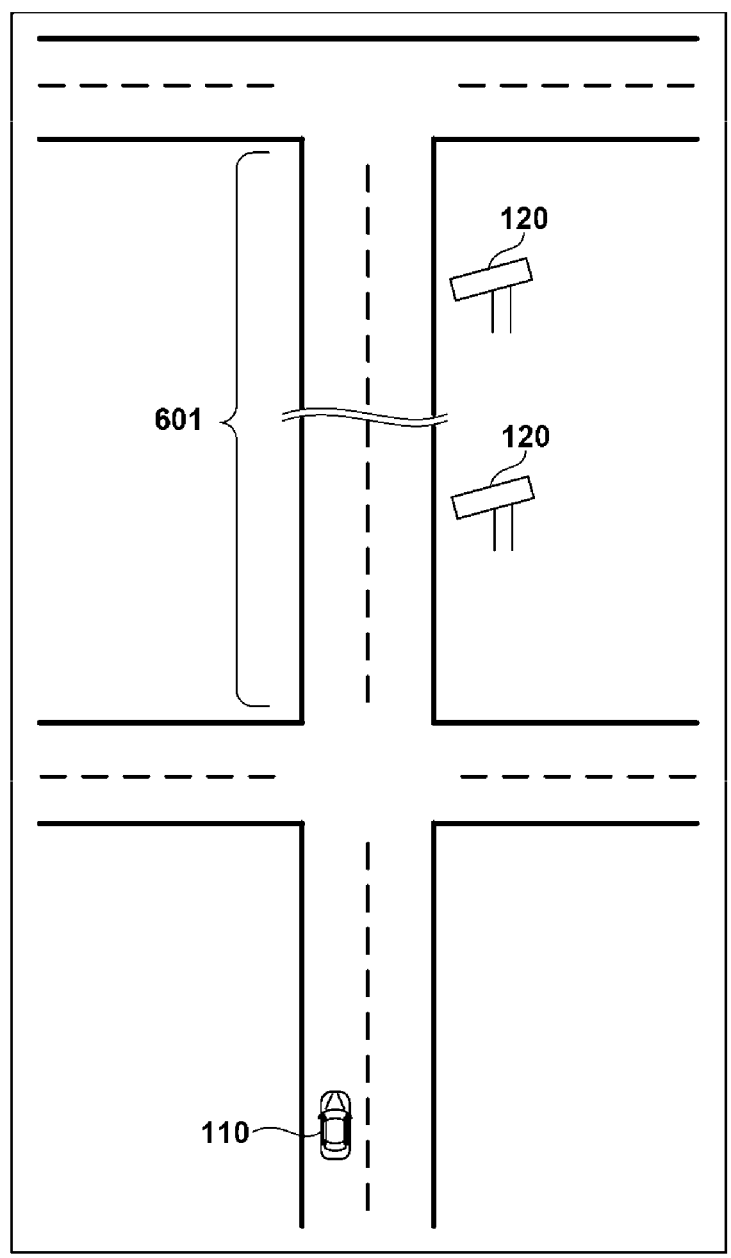
FIG. 6 is a schematic diagram illustrating a road as a subject of control for communication quality according to an exemplary embodiment.

An example of a specific type of user terminal 200 is described while referring to FIG. 6. A road 601 is a road associated with whether or not a predetermined operating mode (e.g., automatic driving mode, remote driving mode) may be executed in a moving body (e.g., vehicle 110) moving on the road. For example, the road 601 may be a road associated with whether or not a remote driving mode may be executed in the vehicle 110. Alternatively, the road 601 may be associated with whether or not an automatic driving mode may be executed, or the road 601 may be associated with whether or not another operating mode may be executed. Furthermore, the concept of a road may include a part of the road.

The road 601 associated with whether or not a remote driving mode can be executed may be a road where the vehicle 110 is scheduled to execute the remote driving mode. The road scheduled for executing the remote driving mode may, for example, be a road having a lane dedicated to remote driving based on traffic regulations or the like. For example, the remote driving device 150 may provide a high-precision remote driving service by acquiring the communication quality from the user terminal 200 associated with the road 601 (e.g., management camera 120 provided along the road 601). Therefore, the remote driving device 150 sets the road 601 as a specific area and monitors or manages the communication quality of the specific area.

Specifically, the remote driving device 150 acquires the communication quality from the user terminal 200 associated with the specific area. The user terminal 200 associated with the specific area may be a user terminal (e.g., management camera 120) used in a condition fixed at a specific geographical position (e.g., a geographical position along the road 601).

Figure 7:
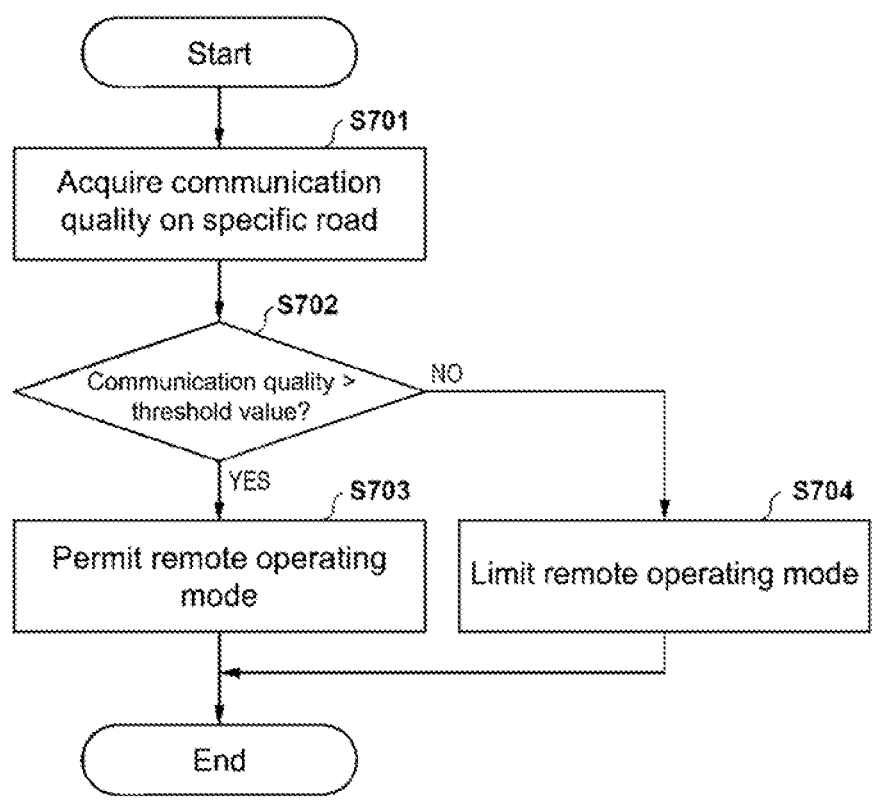
FIG. 7 is a flowchart illustrating a method of controlling a remote driving device according to an exemplary embodiment.

An example of a method of controlling the remote driving device 150 is described while referring to FIG. 7. The method may be performed by a processor of the remote driving device 150 executing a program stored in the memory. Alternatively, some or all steps of the method may be executed in a dedicated circuit such as an ASIC. With the former case, the processor is a component for a specific operation, and with the latter case, the dedicated circuit is a component for a specific operation. The controlling method in FIG. 7 is repeatedly executed while the remote driving device 150 provides a remote driving service to the vehicle 110. While the remote driving device provides a remote driving service, may include a condition where the remote driving device 150 operates the vehicle 110 and a condition where the remote driving device 150 may operate the vehicle 110 (for example, a situation where a condition of the vehicle 110 is monitored).

In step S701, the remote driving device 150 acquires the communication quality on the road 601. Specifically, the remote driving device 150 executes the method of FIG. 4 or FIG. 5 to acquire the communication quality from the user terminal 200 associated with the road 601 (e.g., management camera 120 provided along the road 601). In this manner, the remote driving device 150 manages the communication quality of the road 601. In other words, the remote driving device 150 includes a quality managing part that manages the communication quality of the road 601. Furthermore, the remote driving device 150 controls an operation of the vehicle 110. Therefore, the remote driving device 150 further includes a vehicle controlling part that controls an operation of the vehicle 110.

In step S702, the remote driving device 150 determines whether or not a value of the communication quality on the road 601 is higher than a threshold value. When the value of the communication quality is higher than the threshold value ("YES" in step S702), the remote driving device 150 transitions the process to step S703. In other cases ("NO" in step S702), the remote driving device 150 transitions the process to the step S704. The threshold value may be the communication quality required for providing a remote driving service with a predetermined accuracy.

In step S703, the remote driving device 150 permits execution of the remote driving mode on the road 601. Therefore, the vehicle 110 may travel on the road 601. On the other hand, in step S704, the remote driving device 150 limits execution of the remote driving mode on the road 601. Therefore, the vehicle 110 cannot travel on the road 601.

In the examples in FIG. 6 and FIG. 7, the road 601 is a road dedicated to remote driving, and therefore, the remote driving device 150 determines whether or not the remote driving mode for a vehicle 110 may be executed on the road 601. Alternatively, when the road 601 is a road dedicated to automatic driving, the vehicle 110 may determine whether or not to execute the automatic driving mode for the vehicle on the road 601.

According to one embodiment of the disclosure, a communication system includes: a communication device (130, S402, S501) comprising a memory storing instruction when executed by a processor causes the processor to transmit a command for requesting a response on communication quality to a specific type of user terminal (120), and a user terminal (120, S403, S503) comprising a memory storing instruction when executed by a processor causes the processor to transmit the communication quality in response to the command. With this embodiment, the communication quality based on a type of user terminal may be acquired.

The communication system according to the above embodiment, where the communication device processor broadcasts information identifying the specific type of user terminal and the command (S501), and the user terminal processor determines whether or not the user terminal is the specific type based on the information (S502) and transmits the communication quality if the user terminal is the specific type (S503). With this embodiment, whether or not a user terminal responds to a command may be determined.

The communication system according to any one of the above embodiments, further including a driving device (150) comprising a memory storing instruction when executed by a processor causes the processor to control communication quality of a specific area (601), where the communication device processor specifies a user terminal associated with the specific area as the specific type of user terminal. With this embodiment, the communication quality in a specific area may be acquired.

The communication system according to any one of the above embodiments, where the specific type of user terminal includes at least one of a user terminal in a specific geographical position and a user terminal used in a condition where a geographical position is fixed. With this embodiment, the communication quality of a specific type of user terminal may be acquired.

The communication system according to any one of the above embodiments, where the specific type of user terminal includes a user terminal used in a condition fixed at a specific geographical position. With this embodiment, a stable communication quality at a specific position may be acquired.

The communication system according to the above embodiment, where the specific geographical position is a position associated with a specific road (601). With this embodiment, the communication quality on a specific road may be acquired.

The communication system according to the above embodiment, where the specific road is a road (601) associated with a predetermined operating mode in a moving body moving on the road. With this embodiment, the communication quality on a road associated with a predetermined operating mode may be acquired.

The communication system according to the above embodiment, further including a driving device (110, 150) comprising a memory storing instruction when executed by a processor causes the processor to control an operation of the moving body, where the driving device determines whether or not to execute the predetermined operating mode in the moving body on the specific road based on the communication quality response from the user terminal (S702). With this embodiment, whether or not an operating mode may be executed may be determined based on the communication quality.

The communication system according to the above embodiment, where the driving device (150) is provided in a device that manages the communication quality of a specific area. With this embodiment, a device managing communication quality may control an operation of a moving body.

The communication system according to the above embodiment, where the driving device is provided in the moving body. With this embodiment, a moving body may control its own operation based on the communication quality.

The communication system according to any one of the above embodiments, where the communication device is a wireless base station (130). With this embodiment, a wireless base station may acquire the communication quality.

According to a second embodiment of the disclosure, a computer-implemented method of controlling a communication system including: transmitting by the communication device (130) a command for requesting a response on communication quality to a specific type of user terminal (120) (S402, S501), and receiving by the communication device (120) the communication quality in response to the command from a user terminal (S403, S503). With this embodiment, the communication quality based on a type of user terminal may be acquired.

A non-transitory computer readable storage medium storing instructions that when executed by a processor of a computer, cause the computer to perform the method according to the above embodiment. According to this embodiment, the aforementioned embodiments may be implemented in a program form.

According to a third embodiment of the disclosure, a communication device (130) including a memory storing instruction when executed by a processor causes the processor to transmit a command for requesting a response on communication quality to a specify type of user terminal (120). With this embodiment, the communication quality based on a type of user terminal may be acquired.

According to a fourth embodiment of the disclosure, a user terminal (110, 120) including a memory storing instruction when executed by a processor causes the processor to: receive (S501) information identifying a specific type of user terminal (120) from a communication device (130); determine (S502) whether or not the user terminal is the specific type based on the information; and transmit (S503) the communication quality if the user terminal is the specific type. With this embodiment, the communication quality based on a type of user terminal may be acquired.

The present disclosure is not limited to the aforementioned embodiments, and various changes and modifications may be made without departing from the spirit and scope of the present disclosure. Therefore, the following claims are attached to publish the scope of the present disclosure.

The invention claimed is:

1. A communication system comprising:
  a communication device comprising a memory storing instruction when executed by a processor causes the processor to transmit information identifying a specific type of user terminal and a command requesting a response on communication quality from the specific type of user terminal; and
  a user terminal comprising a memory storing instruction when executed by a processor causes the processor to determine whether the user terminal is the specific type based on the information and, when the user terminal is the specific type, transmit the communication quality in response to the command,
  wherein the communication device processor specifies a user terminal associated with a specific area as the specific type of user terminal, receives a request from a driving device for the communication quality, and transmits the received communication quality from the specific type of user terminal to the driving device.

2. The communication system according to claim 1, further comprising: the driving device comprising a memory storing instruction when executed by a processor causes the processor to acquire the communication quality of the specific area.

3. The communication system according to claim 2, wherein the driving device processor determines whether a value of the communication quality is greater than a threshold value and, when the communication quality value is greater than the threshold value, executes a predetermined operating mode for a moving body.

4. The communication system according to claim 1, wherein the specific type of user terminal includes at least one of a mobile user terminal in a specific geographical position and a fixed user terminal used in a condition where a geographical position is fixed.

5. The communication system according to claim 1, wherein the communication device is a wireless base station.

6. A communication system comprising:
   a communication device comprising a memory storing instruction when executed by a processor causes the processor to transmit information identifying a specific type of user terminal and a command requesting a response on communication quality from the specific type of user terminal;
   a user terminal comprising a memory storing instruction when executed by a processor causes the processor to determine whether the user terminal is the specific type based on the information and, when the user terminal is the specific type, transmit the communication quality in response to the command; and
   a driving device comprising a memory storing instruction when executed by a processor causes the processor to control operation of a moving body,
   wherein, based on the communication quality response from the user terminal, the driving device processor determines whether a value of the communication quality is greater than a threshold value and, when the communication quality value is greater than the threshold value, executes a predetermined operating mode for the moving body.

7. The communication system according to claim 6, wherein the driving device acquires the communication quality of a specific area.

8. The communication system according to claim 6, wherein the driving device is provided in the moving body.

9. The communication system according to claim 6, wherein the specific type of user terminal includes a fixed user terminal used in a condition fixed at a specific geographical position.

10. The communication system according to claim 9, wherein the specific geographical position is a position associated with a specific road.

11. The communication system according to claim 10, wherein the specific road is a road associated with the predetermined operating mode in the moving body moving on the road.

12. A computer-implemented method of controlling a communication system, the method comprising:
    transmitting by a communication device information identifying a specific type of user terminal and a command for requesting a response on communication quality from the specific type of user terminal;
    receiving by the communication device the communication quality from a user terminal in response to the command when the user terminal is the specific type based on the information;
    specifying by the communication device a user terminal associated with a specific area as the specific type of user terminal;
    receiving a request from a driving device for the communication quality; and
    transmitting by the communication device the received communication quality to the driving device.

13. The computer-implemented method of controlling a communication system according to claim 12, wherein the specific type of user terminal includes at least one of a mobile user terminal in a specific geographical position and a fixed user terminal used in a condition where a geographical position is fixed.

14. The computer-implemented method of controlling a communication system according to claim 12, wherein the communication device includes at least one of a wireless base station, a core network device, or a server device.

15. The computer-implemented method of controlling a communication system according to claim 12, further comprising: determining by the user terminal whether or not the user terminal is the specific type based on the information, and transmitting by the user terminal the communication quality when the user terminal determines the user terminal is the specific type.

16. A non-transitory computer readable storage medium storing instructions that when executed by a processor of a computer, cause the computer to perform the method according to claim 12.

17. The computer-implemented method of controlling a communication system according to claim 12, further comprising: determining whether a value of the communication quality is greater than a threshold value and, when the communication quality value is greater than the threshold value, executing a predetermined operating mode for a moving body.

* * * * *